United States Patent Office 2,771,360
Patented Nov. 20, 1956

2,771,360

COBALT BASE ALLOY

Vincent T. Malcolm, Indian Orchard, Mass., assignor to The Chapman Valve Manufacturing Company, Indian Orchard, Springfield, Mass., a corporation of Massachusetts No Drawing. Application September 22, 1954,
Serial No. 457,787

1 Claim. (Cl. 75—171)

My invention relates to improvements in an alloy of cobalt base metal containing chromium, molybdenum, and tantalum which may be used as a weld rod in the hard facing of carbon, low alloy and stainless steels.

The invention relates particularly to a new kind of welding rod, the object of the invention being to provide a new and superior welding rod which has many advantages in applying wear surfaces to steel therewith and to obtain surfaced steel thereby of a more desirable character, for example having a greater hardness and length of wear.

This hard facing is fully capable of being effectively employed for temperatures to 1500° F. under corrosive conditions and subject to high concentrations of stress.

The alloy of this invention is used as a weld rod for applying a coating or hard facing to a portion of the equipment or apparatus which may be subject to corrosion or abrasion.

Such equipment or apparatus on which this alloy coating or facing is deposited by the rod remains virtually unattacked under the condition under which it is used wherefore it has an extremely long life.

In the past, considerable difficulty has been experienced in producing fissure free arc weld deposits using standard weld rods. Cobalt base alloys, when used as weld rods for hard facing, regardless of the techniques of application and close supervision even by the most capable of welders has produced difficulties.

Industry, engaged in this type of hard facing application, has been unable up to now to obtain a sound facing due to hairline cracks, cobweb shrinkage, surface checks, and minute gas porosity appearing in hard facing.

In many cases, however, hard facing deposits containing such defects did not necessarily means the facing would not function on certain items of equipment such as, for example, steam shovel teeth, excavating tools, rolls, or the like, or where machining or grinding was not required, and service conditions were not severe.

Yet, when such hard facings, containing the aforementioned defects, were used in connection with equipment or apparatus for resistance to saturated or superheated steam or oil vapors under temperature, conditions were completely reversed.

Such defects seriously affect the operation of the equipment, especially where such equipment involves valve seats and discs and the like where the slightest condition of porosity or hairline checks causes considerable difficulty and where said defects are aggravated by service operations with consequent failure through leakage.

Many of the defects above noted will pass unnoticed when examined by the naked eye but are readily visible when the hard facing is placed in a fluorescent penetrant oil and is examined under "black light."

In the use of the conventional types of cobalt base alloys for weld rods, fissuring and cratering has resulted from any given technique employed.

The development of a more satisfactory weld rod and/or welding technique was important in view of the increasing need for work of this type.

Using standard weld rods known in the art, various welding techniques have been used as far as preheat and crater practice are concerned. But the results obtained were not consistent for any given technique.

The logical procedure accordingly was to modify the welding rod composition and as a result of considerable experimentation in this effort to eliminate this fissuring and cratering, I have developed this new alloy for the satisfactory accomplishment of said purpose.

The desideratum was to develop a hard surfacing rod which would produce arc test deposits free of fissures.

My invention is based upon a different premise than that upon which previous conventional alloys of the cobalt base types have been based. It employs an element whose success is dependent upon the occurrence of a substantial amount of chemical reaction.

In carrying out the experimental work in connection with this invention, cobalt base alloy welding rods were modified as to the composition thereof.

Certain percentages of tantalum were added to the composition and melted in an electric induction furnace.

The addition of tantalum was found to increase the hot strength and ductility of the weld deposit and the fissuring tendencies of the weld cratering were overcome.

Heats of this modified composition were cast into ¼' weld rods in permanent cast iron molds.

Considerable experimental work was carried out on the hard facing of various steels with this new alloy.

After a thorough inspection by means of black light technique, no fissures, hairline cracks, or cobweb shrinkage was found and the rod had fluidity and stability to wet itself to the base metal which is superior to any previously tested cobalt base alloy.

Considerable testing was carried out to determine the characteristics of the alloy.

Test specimens were made for room temperature (70° F.) and 1200° F. cyclic were testing.

Results are shown in the table below:

| Temp., ° F. | Weight Loss, Gr. | No. of Cycles | Load, lbs. | Wear Factor |
|---|---|---|---|---|
| 70 | Small—0.0053<br>Large—0.0034 | 10,000 | 25 | 1.59 |
| 1,200 | Small—0.0056<br>Large—0.0096 | 5,000 | 25 | 3.48 |

Because of the possibility that the tantalum might make the weld rod susceptible to attack by alkaline solutions at elevated temperatures, small bend bars were immersed in a 40% aqueous solution of NaOH at 230° F. for 100 hours.

After such immersion, samples were bent satisfactorily to least 130° F. without failure.

Sections were cut from the rod for microscopic examination for corrosive attack. No intergranular or transgranular attack was found.

Specimens taken from the alloy rod after subjecting same to various corrosive solutions were microscopically examined and no intergranular or transgranular attack was found in the test specimens.

Subsequently, tests were made of the alloy in oxidizing and reducing atmospheres to 2000° F. with excellent creep strength and stress rupture characteristics were obtained at temperatures as high as 1500° F.

Based on test work with this modified cobalt base alloy containing tantalum, the composition set forth in the table below are preferred for the purpose intended:

TABLE I

*General coverage, percent*

| | |
|---|---|
| Carbon (C) | 0.20–0.50 |
| Manganese (Mn) | 0.40–1.00 |
| Silicon (Si) | 0.20–0.40 |
| Chromium (Cr) | 25.00–35.00 |
| Nickel (Ni) | 4.00 Max. |
| Molybdenum (Mo) | 4.00–6.00 |
| Iron (Fe) | 2.00 Max. |
| Tantalum (Ta) | 2.00–4.00 |
| Cobalt (Co) | Balance |

It is essential that the alloy include not less than 25% chromium, not less than 4% molybdenum, and not less than 2% tantalum; the ranges, therefore being chromium content 25% to 35%, molybdenum content 4% to 6%, and tantalum content 2% to 6%.

A typical example of an alloy composition which has been found to yield satisfactory results is carbon 0.40%, manganese 0.60%, silicon 0.30%, chromium 30.00%, nickel 2.00%, molybdenum 4.50%, iron 0.50%, tantalum 2.50%, and a balance essentially of cobalt.

Having thus described the best embodiments of my invention and the best method of practicing the new process for forming this novel composition, without being limited to the proportions of parts employed therein, or to the precise ingredients named therein, as it is evident that each of those ingredients has a considerable range of equivalents, and as it is also evident that the order and proportions of the process may be carried out without departing from its scope and purposes, what it is desired to claim and secure by Letters Patent of the United States is:

A cobalt base alloy having excellent stress rupture characteristics at a temperature of 1500° F., said alloy consisting essentially as follows: 0.20–0.50% by weight of carbon, 0.40–1.00% by weight of manganese, 0.20–0.40% by weight of silicon, 25.00–35.00% by weight of chromium, a maximum of 4.00% by weight of nickel, 4.00–6.00% by weight of molybdenum, a maximum of 2.00% by weight of iron, 2.00–4.00% by weight of tantalum, and a balance of cobalt.

References Cited in the file of this patent

UNITED STATES PATENTS 2,445,951    Kihlgren et al. _____ July 27, 1948

OTHER REFERENCES

Acher et al.: "Molybdenum Steels, Irons, Alloys," New York: Climax Molybdenum Co., 1949, page 321.

De Ment et al.: "Rarer Metals," Brooklyn: Chemical Publishing Co., 1946, page 159.